(12) United States Patent
Iqbal

(10) Patent No.: US 10,970,769 B2
(45) Date of Patent: Apr. 6, 2021

(54) METHOD AND SYSTEM FOR OPTIMIZING WEBSITE SEARCHING WITH USER PATHING

(71) Applicant: Overstock.com, Inc., Midvale, UT (US)

(72) Inventor: Nasreen Iqbal, Midvale, UT (US)

(73) Assignee: Overstock.com, Inc., Midvale, UT (US)

( * ) Notice: Subject to any disclaimer, the term of this patent is extended or adjusted under 35 U.S.C. 154(b) by 566 days.

(21) Appl. No.: 15/448,353

(22) Filed: Mar. 2, 2017

(65) Prior Publication Data

US 2018/0253776 A1    Sep. 6, 2018

(51) Int. Cl.
*G06Q 30/00*    (2012.01)
*G06Q 30/06*    (2012.01)
(Continued)

(52) U.S. Cl.
CPC ... *G06Q 30/0625* (2013.01); *G06F 16/24578* (2019.01); *G06F 16/9535* (2019.01);
(Continued)

(58) Field of Classification Search
CPC .................. G06Q 30/0601–0645; G06Q 30/08
(Continued)

(56) References Cited

U.S. PATENT DOCUMENTS 3,573,747 A    4/1971    Adams et al.
3,581,072 A    5/1971    Nymeyer
(Continued)

FOREIGN PATENT DOCUMENTS

CA    2253543    10/1997
CA    2347812    5/2000
(Continued)

OTHER PUBLICATIONS

Alex, Neil, "Optimizing Search Results in Elasticsearch with Scoring and Boosting", Mar. 18, 2015, Qbox.io, accessed at [https://qbox.io/blog/optimizing-search-results-in-elasticsearch-with-scoring-and-boosting] (Year: 2015).*

(Continued)

*Primary Examiner* — Jeffrey A. Smith
*Assistant Examiner* — Lindsey B Smith
(74) *Attorney, Agent, or Firm* — Clayton Howarth, P.C.

(57) ABSTRACT

A system and method for creating an e-commerce, dynamic, internal search engine are disclosed. The system and method include providing a server having a memory and a processor, and providing the server with a search engine configured to perform the steps of: identifying a first user search term that results in a first search result and the number of occurrences the first search term is input into the search engine. The search engine then identifies a second user search term input into the search engine subsequent to the first user search term and the number of occurrences the second search term is input into the search engine and identifies the number of occurrences when the second search term yields a successful search result. The search engine then modifies subsequent search results facilitated by the first user search term to reflect the number of successful search results of the second search term.

20 Claims, 6 Drawing Sheets

(51) Int. Cl.
*G06F 16/9535* (2019.01)
*G06F 16/2457* (2019.01)
*G06F 16/2453* (2019.01)

(52) U.S. Cl.
CPC ......... *G06Q 30/06* (2013.01); *G06Q 30/0623* (2013.01); *G06Q 30/0631* (2013.01); *G06Q 30/0641* (2013.01); *G06F 16/2453* (2019.01)

(58) Field of Classification Search
USPC .............................................. 705/26.1–27.2
See application file for complete search history.

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Orish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,477 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhai |
| 6,373,933 B1 | 4/2002 | Sarkki et al. |
| 6,374,260 B1 | 4/2002 | Hoffert et al. |
| 6,381,510 B1 | 4/2002 | Amidhozour et al. |

(56) References Cited

U.S. PATENT DOCUMENTS

| | | |
|---|---|---|
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | David et al. |
| 6,661,431 B1 | 12/2003 | Stuart et al. |
| 6,665,838 B1 | 12/2003 | Brown et al. |
| 6,701,310 B1 | 3/2004 | Sugiura et al. |
| 6,718,536 B2 | 4/2004 | Dupaquis |
| 6,725,268 B1 | 4/2004 | Jacket et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2 | 5/2005 | Himmel et al. |
| 6,907,401 B1 | 6/2005 | Vittal et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Elgen et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,254,547 B1 | 8/2007 | Beck et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,401,025 B1 | 7/2008 | Lokitz |
| 7,447,646 B1 | 11/2008 | Agarwal et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,912,748 B1 | 3/2011 | Rosenberg et al. |
| 7,983,950 B2 | 7/2011 | DeVita |
| 8,086,643 B1 | 12/2011 | Tenorio |
| 8,112,303 B2 | 2/2012 | Eglen et al. |
| 8,140,989 B2 | 3/2012 | Cohen et al. |
| 8,214,264 B2 | 7/2012 | Kasavin et al. |
| 8,260,852 B1 | 9/2012 | Cselle |
| 8,312,056 B1 | 11/2012 | Peng et al. |
| 8,494,912 B2 | 7/2013 | Fraser et al. |
| 8,577,740 B1 | 11/2013 | Murray et al. |
| 8,693,494 B2 | 4/2014 | Fiatal |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007356 A1 | 1/2002 | Rice et al. |
| 2002/0013721 A1 | 1/2002 | Capel et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0099578 A1 | 7/2002 | Eicher et al. |
| 2002/0099579 A1 | 7/2002 | Scelzo et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0120537 A1 | 8/2002 | Campbell et al. |
| 2002/0123957 A1 | 9/2002 | Notarius et al. |
| 2002/0129282 A1 | 9/2002 | Hopkins |
| 2002/0138399 A1 | 9/2002 | Hayes et al. |
| 2002/0147625 A1 | 10/2002 | Kolke |
| 2002/0161648 A1 | 10/2002 | Mason et al. |
| 2002/0188777 A1 | 12/2002 | Kraft et al. |
| 2002/0194049 A1 | 12/2002 | Boyd |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Burk et al. |
| 2003/0083961 A1 | 5/2003 | Bezos et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Lippert et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128320 A1 | 7/2004 | Grove et al. |

(56) References Cited

U.S. PATENT DOCUMENTS

| | | |
|---|---|---|
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204991 A1 | 10/2004 | Monahan et al. |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0010925 A1 | 1/2005 | Khawand et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Peraris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarukkai et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0230035 A1* | 10/2006 | Bailey ............... G06F 16/24578 |
| 2006/0259360 A1 | 11/2006 | Flinn et al. |
| 2006/0271671 A1 | 11/2006 | Hansen |
| 2006/0282304 A1 | 12/2006 | Bedard et al. |
| 2007/0005424 A1 | 1/2007 | Arauz |
| 2007/0027760 A1 | 2/2007 | Collins et al. |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0083437 A1 | 4/2007 | Hamor |
| 2007/0100803 A1 | 5/2007 | Cava |
| 2007/0160345 A1 | 7/2007 | Sakai et al. |
| 2007/0162379 A1 | 7/2007 | Skinner |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0299743 A1 | 12/2007 | Staib et al. |
| 2008/0015938 A1 | 1/2008 | Haddad et al. |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0106080 A1 | 4/2009 | Carrier et al. |
| 2009/0106127 A1 | 4/2009 | Purdy et al. |
| 2009/0119167 A1 | 5/2009 | Kendall et al. |
| 2009/0164323 A1 | 6/2009 | Byrne |
| 2009/0182589 A1 | 7/2009 | Kendall et al. |
| 2009/0204848 A1 | 8/2009 | Kube et al. |
| 2009/0222348 A1 | 9/2009 | Ransom et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2010/0042684 A1 | 2/2010 | Broms et al. |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0146413 A1 | 6/2010 | Yu |
| 2010/0228617 A1 | 9/2010 | Ransom et al. |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0153383 A1 | 6/2011 | Bhattacharjya et al. |
| 2011/0153663 A1 | 6/2011 | Koren et al. |
| 2011/0191319 A1* | 8/2011 | Nie ................. G06F 16/3338 707/706 |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0271204 A1 | 11/2011 | Jones et al. |
| 2011/0276513 A1 | 11/2011 | Erhart et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Maghoul et al. |
| 2012/0166299 A1 | 6/2012 | Heinstein et al. |
| 2012/0231424 A1 | 9/2012 | Calman et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0268561 A1 | 10/2013 | Christie et al. |
| 2014/0019313 A1 | 1/2014 | Hu et al. |
| 2014/0025509 A1 | 1/2014 | Reisz et al. |
| 2014/0032544 A1 | 1/2014 | Mathieu et al. |
| 2014/0114680 A1 | 4/2014 | Mills et al. |
| 2014/0136290 A1 | 5/2014 | Schiestl et al. |
| 2014/0172652 A1 | 6/2014 | Pobbathi et al. |
| 2014/0289005 A1 | 9/2014 | Laing et al. |
| 2017/0344622 A1* | 11/2017 | Islam ................. G06Q 30/0625 |

FOREIGN PATENT DOCUMENTS

| | | |
|---|---|---|
| EP | 0636993 | 4/1999 |
| EP | 0807891 | 5/2000 |
| EP | 1241603 | 3/2001 |
| GB | 2397400 | 7/2004 |
| GB | 2424098 | 9/2006 |
| JP | 2001283083 | 10/2001 |
| WO | 9717663 | 5/1997 |
| WO | 9832289 | 7/1998 |
| WO | 9847082 | 10/1998 |
| WO | 9849641 | 11/1998 |
| WO | 9959283 | 11/1999 |
| WO | 0025218 | 5/2000 |
| WO | 0109803 | 2/2001 |
| WO | 0182135 | 11/2001 |

(56) References Cited

FOREIGN PATENT DOCUMENTS

| WO | 200197099 | 12/2001 |
|----|-----------|---------|
| WO | 200237234 | 11/2002 |
| WO | 2003094080 | 11/2003 |
| WO | 2012093410 | 7/2012 |

OTHER PUBLICATIONS

Massimb et al., "Electronic Trading, Market Structure and Liquidity," Financial Analysts Journal, Jan.-Feb. 1994, pp. 39-49.

McGinnity, "Build Your Weapon," PC Magazine, Apr. 24, 2011, printed from www.pcmag.com/print_article2?0,1217,a%253D3955,00. asp.

Meade, "Visual 360: a performance appraisal system that's 'fun,'" HR Magazine, 44, 7, 118(3), Jul. 1999.

"Mediappraise: Mediappraise Receives National Award for Web-Based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

metails.com, www.metails.com homepage, printed Oct. 13, 2004.

Microsoft Computer Dictionary, Fifth Edition, front matter and p. 33.

Microsoft Computer Dictionary, Fifth Edition, front matter, back matter, and pp. 479, 486.

Neches, "FAST—A Research Project in Electronic Commerce," Electronic Markets—The International Journal, Oct. 1993, 4 pages, vol. 3., No. 3.

Neo, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets—The International Journal, Oct. 1993, 2 pages, vol. 3, No. 3.

"ONSALE: ONSALE Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcommand,DWEBPRINT%20810-489267.

"ONSALE joins fray as online shopping pcks up speed: INTERNET BOOMS," Comptuer Reseller News, Jun. 5, 1995.

Palm, Inc., PalmTM Web Pro Handbook, copyright 2002-2003.

Post et al., "Application of Auctions as a Pricing Mechanism for the Interchange of Electric Power," IEEE Transactions of Power Systems, Aug. 1995, pp. 1580-1584, vol. 10, No. 3.

Preist et al., "Adaptive agents in a persistent shout double auction," International Conference on Information and Computation, Proceedings of the first international conference on information and computation economies, Oct. 25-28, 1998, Charleston, United States, pp. 11-18.

Qualcomm, "Brew Developer Support," printed from web.archive.org/web/20020209194207/http://www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

Reck, "Formally Specifying an Automated Trade Execution System," J. Systems Software, 1993, pp. 245-252, vol. 21.

Reck, "Trading-Process Characteristics of Electronic Auctions," Electronic Markets—The International Journal, Dec. 1997, pp. 17-23, vol. 7, No. 4.

repcheck.com, www.repcheck.com homepage, printed from web.archive.org/web/20020330183132/http://repcheck.com on Sep. 5, 2009.

Resnick et al., "Reputation Systems," Communications of the ACM, Dec. 2000, pp. 45-48, vol. 43, No. 12.

Rockoff et al., "Design of an Internet-based system for remote Dutch auctions," Internet Research: Electronic Networking Applications and Policy, 1995, pp. 10-16, vol. 5, No. 4.

Rose, "Vendors strive to undo Adobe lock-hold," Computer Reseller News, Feb. 5, 1996, n 66669, p. 71(7).

Rysavy, "Mobile-commerce ASPs do the legwork," Network Computing, Jan. 22, 2001, p. 71, 6 pgs., vol. 12, No. 2.

Saunders, "AdFlight to Offer WAP Ads," Oct. 17, 2000, printed from clickz.com/487531/print.

Schmid, "Electronic Markets," Electronic Markets—The International Journal, Oct. 1993, 2 pages, vol. 3, No. 3.

Schwankert, "Matsushita Taps 2Roam for Wireless Solutions," www.internetnews.com/bus-news.article.php/674811, Feb. 2, 2001.

Sen, "Inventory and Pricing Models for Perishable Products," Doctor of Philosophy Dissertation—University of Southern California, Aug. 2000.

Siegmann, "Nowhere to go but up," PC Week, Oct. 23, 1995, 3 pages, vol. 12, No. 42.

Telephony Staff, "Air-ASP," Telephony Online, Oct. 2, 2000, 3 pages.

Teo, "Organizational Factors of Success in Using EDIS: A Survey of Tradenet Participants," Electronic Markets—The International Journal, Oct. 1993, 2 pages, vol. 3, No. 3.

Tjostheim et al., "A case study of an on-line auction for the World Wide Web," printed from www.nr.no/gem/elcom/puplikasjoner/enter98e.html on Jun. 10, 1990, 10 pages.

Turban, "Auctions and Bidding on the Internet: An Assessment," Electronic Markets—The International Journal, Dec. 1997, 5 pages, vol. 7, No. 4.

ubid.com, "How do I Updated my Address, Phone, Credit Card, Password, etc.?" printed from web.archive.org/web/20010208113903/www.ubid.com/help/topic13asp on Aug. 30, 2007.

ubid.com, "How do I track my shipment?" printed from web.archive.org/web/20010331032659/www.ubid.com/help/topic27.asp on Aug. 30, 2007.

ubid.com, "Can I track all of my bids from My Page?" printed from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSWIRE, Sep. 23, 2002.

Warbelow et al., "AUCNET: TV Auction Network System," Harvard Business School 9-190-001, Jul. 19, 1989, Rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

xchanger.net, webpage printed from www.auctiva.com/showcases/as_4sale.asp?uid=exchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

2Roam, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 1, No. 3.

(56) References Cited

OTHER PUBLICATIONS

Anonymous, Image manipulation (image-editing software and image-manipulation systems)(Seybold Special Report, Part II), Seybold Report on Publishing Systems, May 15, 1995, pS35(9), vol. 24, No. 18.

auctionwatch.com, multiple pages—including search results for "expedition," printed Apr. 21, 2011.

auctiva.com, multiple pages, undated but website copyright date is "1999-2000."

Ball et al., "Supply chain infrastructures: system integration and information sharing," ACM SIGMOD Record, 2002, vol. 31, No. 1, pp. 61-66.

Berger et al., "Random Ultiple-Access Communication and Group Testing," IEEE, 1984.

Braganza, "Is Resarch at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business/technology editors, "Sellers Flock to OutletZoo. com as New Automatic Price Drop Method Moves Excess Inventory Online," Business Wire, Oct. 25, 1999.

Business Wire business editors/high-tech writers, "PictureWorks Technology, Inc. Expands in Real Estate Market with Adoption of Rimfire on REALTOR.com," Business Wire, Nov. 8, 1999.

Business Wire business editors/high-tech writers, "PictureWorks Technology, Inc. Shows Strong Revenue Growth in Internet Imaging Business," Business Wire, Nov. 10, 1999.

Business Wire business editors/high-tech writers, "2Roam Partners with Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for getting Things Done is on More Wireless Devices, with Ability to Purchase Its Products from Anywhere," Business Wire, Oct. 2, 2000.

Business Wire business editors/high-tech writers, "2Roam Drives Hertz to the Wireless Web: Number One Car Rental Company to Provide Customers Wireless Access from Any Device," Business Wire, Aug. 7, 2001.

buy.com, www.buy.com homepage, printed Oct. 13, 2004.

Chen et al., "Detecting Web Page Structure for Adaptive Viewing on Small Form Factor Devices," ACM, May 20-24, 2003.

Chen, M. (2007). Knowledge assisted data management and retrieval in multimedia database systems (Order No. 3268643).

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

friendster.com, homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1993, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

IBM, "Anyonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

ICROSSING, "ICROSSING Search Synergy: Natural & Paid Search Symbiosis," Mar. 2007.

IEEE 100—The Authoritative Dictionary of IEEE Standard Terms, Seventh Edition, 2000. Entire book cited; table of contents, source list, and terms beginning with A included. ISBN 0-7381-2601-2.

Ives et al., "Editor's Comments—MISQ Central: Creating a New Intellectual Infrastructure," MIS Quarterly, Sep. 1994, p. xxxv.

Joshi, "Information visibility and its effect on supply chain dynamics," Ph.D. dissertation, Massachusetts Institute of Technology, 2000 (fig. 4.5; p. 45).

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

Kuula, "Telematic Services in Finland," Electronic Markets—The International Journal, Oct. 1993, 1 page, vol. 3, No. 3.

Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.

Lee et al., "Electronic Brokerage and Electronic Auction: The Impact of IT on Market Structures," Proceedings of the 29th Annual Hawaii International Conference on System Sciences, 1996, pp. 397-406.

Lee, "AUCNET: Electronic Intermediary for Used-Car Transactions," Electronic Market—The International Journal, Dec. 1997, pp. 24-28, vol. 7, No. 4.

LIVE365 press release, "Live365 to Offer Opt-In Advertising on Its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol. 30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

* cited by examiner

| term 1 | term2 | count1 | cntb | conf score |
|---|---|---|---|---|
| Indoor chaise lounge | Chaise lounge | 172 | 139 | 0.80814 |
| Indoor chaise | Chaise | 89 | 67 | 0.752809 |
| Indoor chaise | Chaise lounge | 89 | 29 | 0.325843 |
| Indoor chaise | Indoor chaise lounge | 89 | 27 | 0.303371 |
| Chaise sofa | Chaise lounge | 111 | 31 | 0.279279 |
| Indoor chaise lounge | Chaise | 172 | 34 | 0.197674 |
| Indoor chaise lounge | Chaise | 172 | 25 | 0.145349 |
| Outdoor chaise lounge | Chaise lounge | 297 | 36 | 0.121212 |
| Chaise | Chaise lounge | 1122 | 110 | 0.098039 |
| Chaise | Chair | 1122 | 32 | 0.02852 |
| Chaise lounge | Chair | 1428 | 26 | 0.018207 |

Fig. 3

| Term A | Term B | Success A | Success B | Conf Score |
|---|---|---|---|---|
| Crockpot | Slow cooker | 0.2 | 0.4 | 0.66 |
| Slowcooker | Crockpot | 0.4 | 0.2 | 0.1 |
| Indoor chaise | Chaise lounge | 0.15 | 0.8 | 0.85 |
| Chaise lounge | Indoor chaise | 0.8 | 0.15 | 0.85 |
| Indoor chaise lounge | Chaise lounge | 0.3 | 0.8 | 0.197674 |

Fig. 6

METHOD AND SYSTEM FOR OPTIMIZING WEBSITE SEARCHING WITH USER PATHING

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND

1. The Field of the Invention

The present disclosure relates generally to managing products listed on e-commerce websites, and more particularly, but not necessarily entirely, to improving internal searching of an e-commerce website to compensate and adjust user product searches based on historical data on user pathing and related products.

2. Description of Related Art

Sellers have long been able to list items for sale on e-commerce websites. These e-commerce websites are often created having user search engines to identify and locate products and product inventory available for sale.

Inherent problems often result from the users' use of these product search engines. For example, a user may misspell a key word or name of a product, resulting in no search results or irrelevant search results. Users may also be unfamiliar with industry naming conventions and taxonomy resulting in the users being unsatisfied with the search results and leaving or abandoning the website. Users may also become frustrated with multiple searches and "refining" searches resulting in cumbersome search results.

These search engine problems often result in users failing to locate desired products on the e-commerce website, even though such desired products may be available on the website, but are not located or found by the user.

Another problem with product search engines results from trending products or product terms. Some search terms may be used in higher frequency at specific times of the year and relate to different types of products depending on the season or proximity to a popular holiday. Therefore, there is a significant need for a product search engine that is dynamic and can modify search results on a rolling basis to better ensure that users are able to identify and locate desired products on an e-commerce website regardless of the season.

The features and advantages of the disclosure will be set forth in the description that follows, and in part will be apparent from the description or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 3 is an example of a data table utilized by an embodiment of the present invention;

FIG. 6 is a data table utilized by a further embodiment of the present invention.

DETAILED DESCRIPTION

Figure 1:
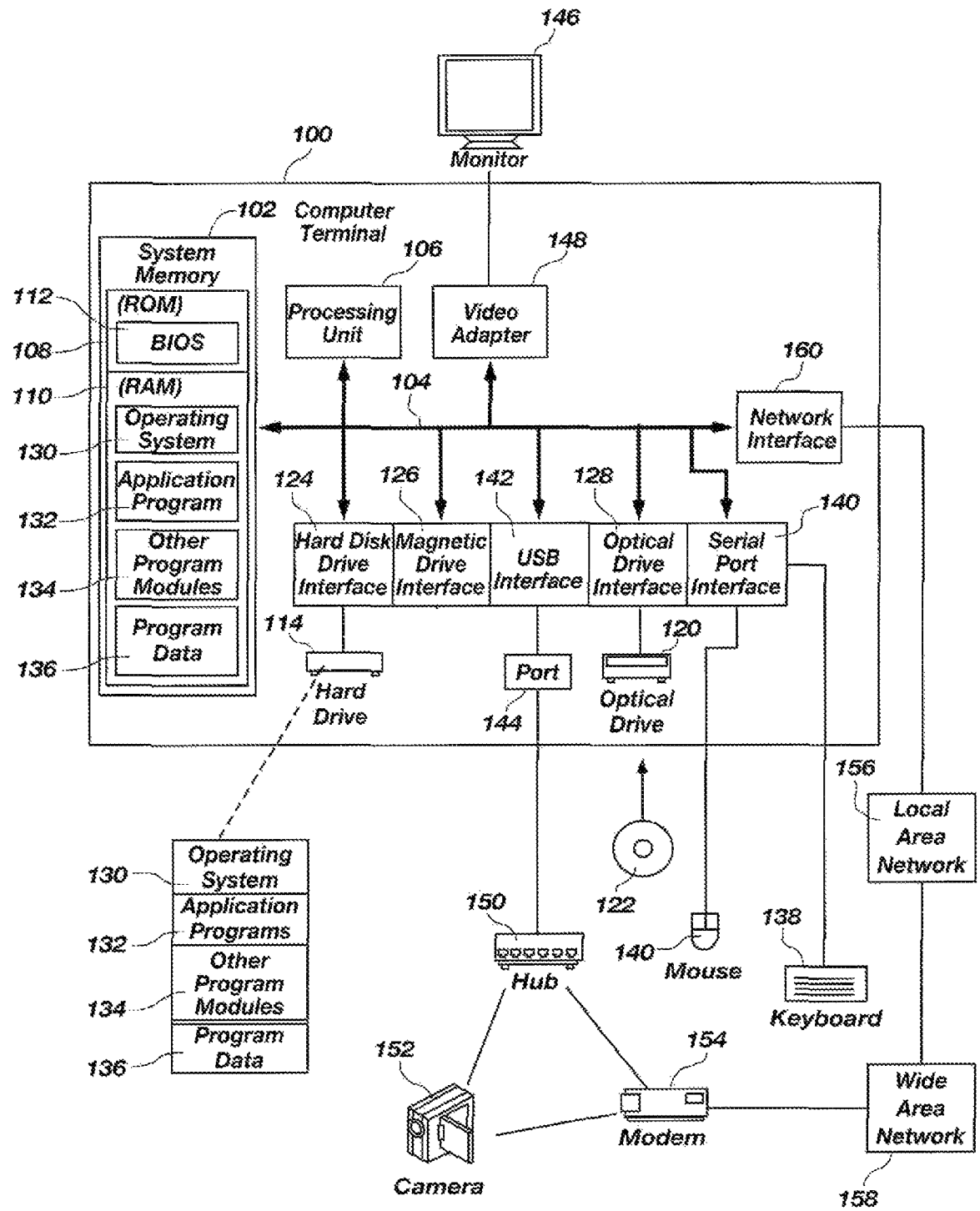
FIG. 1 is a diagram of a computing device suitable for use with the present invention.

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "characterized by," and grammatical equivalents thereof are inclusive or open-ended terms that do not exclude additional, unrecited elements or method steps.

Reference throughout this specification to "one embodiment," "an embodiment" or "illustrative embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Reference to a computer program may take any form capable of generating a signal, causing a signal to be generated, or causing execution of a program of machine-readable instructions on a digital processing apparatus. A computer program may be embodied by a transmission line, an optical storage medium, digital-video disk, a magnetic tape, a Bernoulli drive, a magnetic disk, a punch card, flash memory, integrated circuits, or other digital processing apparatus memory device.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

Referring now to FIG. 1, there is shown an exemplary embodiment of a computer 100, that may be used for the computing devices used in the present disclosure. It will be appreciated that the computing devices may have more or fewer features than shown in FIG. 1 as the individual circumstances require. Further, the computer 100 shown in FIG. 1 may have various forms, including a desktop PC, a laptop or a portable tablet form, or a hand held form. The features shown in FIG. 1 may be integrated or separable from the computer 100. For example, while a monitor 146 is shown in FIG. 1 as being separate, it may be integrated into the computer 100, such as the case of a laptop or tablet type computer.

The computer 100 may include a system memory 102, and a system bus 104 that interconnects various system components including the system memory 102 to the processing unit 106. The system bus 104 may be any of several types of bus structures including a memory bus or memory controller, a peripheral bus, and a local bus using any of a variety of bus architectures as is known to those skilled in the relevant art. The system memory may include read only memory (ROM) 108 and random access memory (RAM) 110. A basic input/output system (BIOS) 112, containing the basic routines that help to transfer information between elements within the computer 100, such as during start-up, is stored in ROM 108. The computer 100 may further include a hard disk drive 114 for reading and writing information to a hard disk (not shown) and an optical disk drive 120 for reading from or writing to a removable optical disk 122 such as a CD ROM, DVD, or other optical media.

It will be appreciated that the hard disk drive 114 and optical disk drive 120 may be connected to the system bus 104 by a hard disk drive interface 124 and an optical disk drive interface 128, respectively. The drives and their associated computer-readable media provide nonvolatile storage of computer readable instructions, data structures, program modules and other data for the computer 100. Although the exemplary environment described herein employs a hard disk and a removable optical disk 122, it will be appreciated by those skilled in the relevant art that other types of computer readable media that can store data that are accessible by a computer, such as magnetic cassettes, flash memory cards, digital video disks, Bernoulli cartridges, random access memories, read only memories, and the like may also be used in the exemplary operating environment.

A number of program modules may be stored on the hard disk 114, optical disk 122, ROM 108 or RAM 110, including an operating system 130, one or more applications programs 132, other program modules 134, and program data 136. A user may enter commands and information into the computer 100 through input devices such as a keyboard 138 and a pointing device 140, such as a mouse. Other input devices (not shown) may include a joystick, game pad, satellite dish, scanner, or the like. These and other input devices are often connected to the processing unit 106 through a serial port interface 140 that is coupled to the system bus 104. Such devices can be connected by a universal serial bus (USB) interface 142 with a USB port 144 and to which other hubs and devices may be connected. Other interfaces (not shown) that may be used include parallel ports, game ports, and the IEEE 1394 specification.

A monitor 146 or other type of display device is also connected to the system bus 104 via an interface, such as a video adapter 148. In addition to the monitor 146, computers 100 typically include other peripheral output or input devices. A resistive finger touch screen may also be used.

A USB hub 150 is shown connected to the USB port 144. The hub 150 may in turn be connected to other devices such as a digital camera 152 and modem 154. Although not shown, it is well understood by those having the relevant skill in the art that a keyboard, scanner, printer, external drives (e.g., hard, disk and optical) and a pointing device may be connected to the USB port 144 or the hub 150. Thus, it should be understood that additional cameras and devices may be directly connected to the computer through the USB port 144. Thus, the system depicted is capable of communicating with a network and sending/receiving audio, video, and data.

The computer 100 may operate in a networked environment using logical connections to one or more remote computers. The types of connections between networked devices include dial up modems, e.g., modem 154 may be directly used to connect to another modem, ISDN, xDSL, cable modems, wireless and include connections spanning users connected to the Internet. The remote computer may be another personal computer, a server, a router, a network PC, a peer device or other common network node, and typically includes many or all of the elements described above relative to the computer 100 in FIG. 1. The logical connections depicted in FIG. 1 include a local area network (LAN) 156 and a wide area network (WAN) 158. Such networking environments are commonplace in offices, enterprise-wide computer networks, intranets, and the Internet.

When used in a LAN networking environment, the computer 100 is connected to the local network 156 through a network interface or adapter 160. The computer 100 may also connect to the LAN via through any wireless communication standard. When used in a WAN networking environment, the computer 100 typically uses modem 154 or other means for establishing communications over the wide area network 158. It should be noted that modem 154 may be internal or external and is connected to the system bus 104 through USB port 144. A modem may optionally be connected to system bus 104 through the serial port interface 140. It will be appreciated that the network connections shown are exemplary and other means of establishing a communications link between the computers may be used, e.g., from a LAN gateway to WAN.

Further, the computer 100 may take many forms as is known to those having relevant skill in the art, including a desk top personal computer, a lap top computer, a hand held computer, tablet, and the like.

Generally, the data processors of computer 100 are programmed by means of instructions stored at different times in the various computer-readable storage media of the computer. At execution, they are loaded at least partially into the computer's primary electronic memory. The disclosure described herein includes these and other various types of computer-readable storage media when such media contain instructions or programs for implementing the steps described herein in conjunction with a microprocessor or other data processor. The disclosure also includes the computer itself when programmed according to the methods and techniques described herein.

A server may also take substantially the same form as the computer 100 shown in FIG. 1. The server and corresponding data analysis programs and processor must be capable of processing and analyzing tera-bytes of data and more than 55 million records or data entries on a daily basis. Without such unique servers and processors, having such processor speed and server capabilities the disclosed embodiments of the present invention would not be able to perform the analysis and calculations in such a way that would enable the invention. For example, Hadoop clusters, Matchpath, Spark, or other similarly capable data processors are required to enable the extreme quantity of data analyzed by the present invention and the output of the invention be far less effective, and possibly ineffective, without the requisite server and processor speed and capacity. The disclosed embodiments are dynamic and depend upon the ability to process very large amounts of data on a daily basis, or even multiple times a day, without which the disclosed invention would be inoperable.

Figure 2:
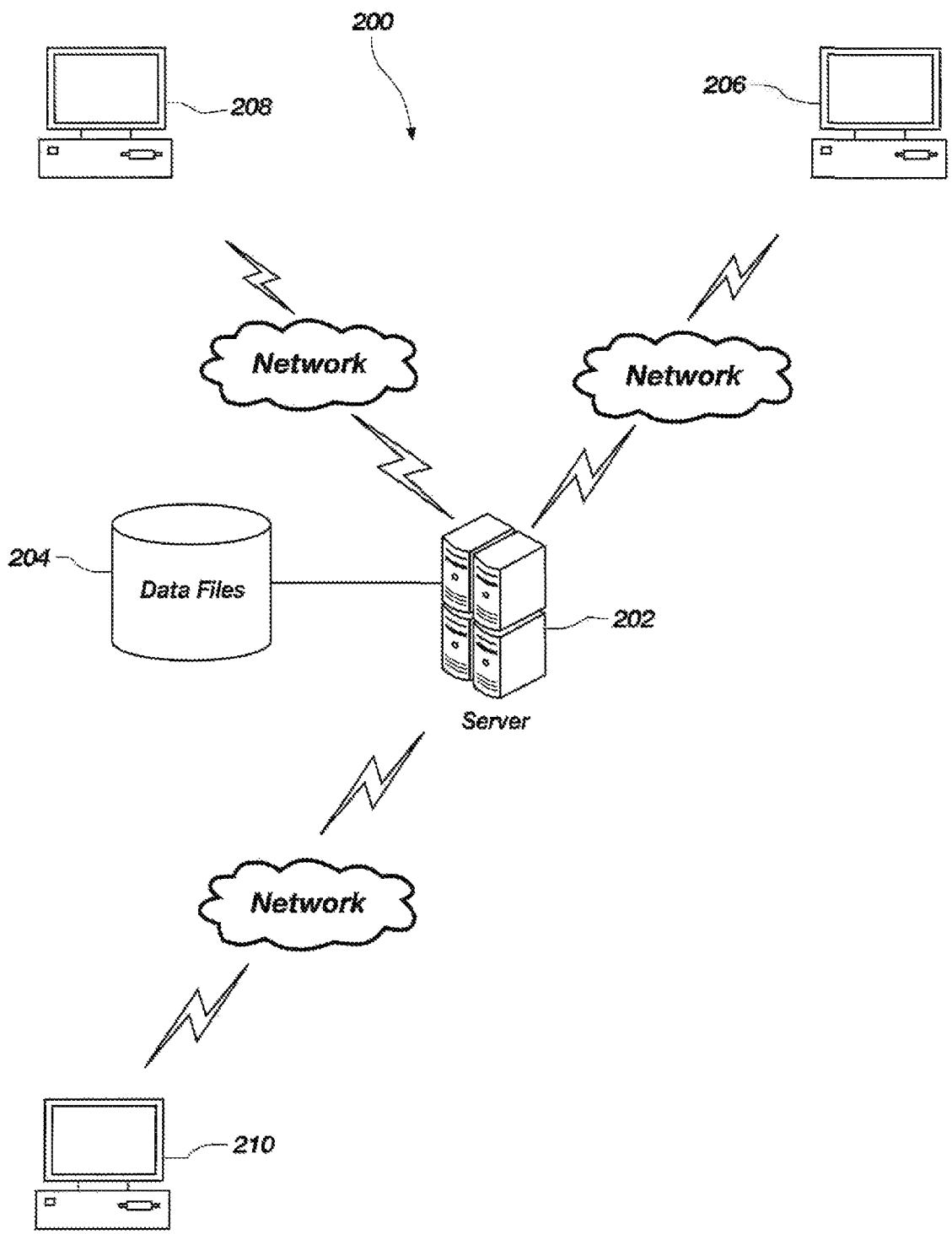
FIG. 2 is a diagram of a computing server and network suitable for use with the present invention.

Referring now to FIG. 2, there is shown a system 200 pursuant to one embodiment of the present disclosure for allowing e-commerce between buyers and sellers via a seller website hosted on a server 202. As used herein, the term "e-commerce" refers to the buying and selling of goods and services on the Internet or the offer to buy or sell goods and services on the Internet. In one embodiment, the server 202 is operated and controlled by a seller. This seller may be referred to herein as the "Website Operator."

The Website Operator provides a service to allow buyers to engage in e-commerce using its server 202. Typically, the seller may offer its goods through the server 202 to create an online marketplace. Numerous buyers may also access the server 202 as well. Access to server 202 by buyers may be accomplished through a login procedure as is known to one having ordinary skill in the art, or may be openly accessible to the public.

The server 202 is connected to an electronic storage medium 204. Residing on the storage medium 204 are data related to seller's products and/or services, hereinafter referred to generally as Product Information, and customer or user path data and click history. The Product Information may be uploaded directly from a seller's computer terminal 206 over a network.

The Product Information is uploaded in a manner such that the Product Information is associated with the seller. The Product Information may be updated as often as is necessary over a network, including, without limitation, daily, weekly and monthly.

The seller may also access server 202 remotely, before or after the Product Information has been uploaded to allow the seller to manage its listings.

The server 202 may provide webpages to a prospective buyers' terminals 208 and 210 when requested over a network. The webpages may provide the necessary Product Information to the prospective buyer. The webpages may also allow the buyer to search, place a bid, make an offer, request additional information, or purchase the product at the asking price. The webpages may allow for advanced searching of the products offered through server 202 by sellers.

It will be appreciated by those having ordinary skill in the art that the seller's computer terminal 206 and the buyers' terminals 208 and 210 may take the form of terminal 100 discussed in relation to FIG. 1 above. Moreover, the server 202 may also take the form of any host computer on a network that holds information and responds to requests for information from it. It should be noted that the term "server" as used herein is also used to refer to the software that makes the act of serving information possible. The term "server" also refers to commerce servers, for example, that use software to run the main functions of an e-commerce Website, such as product display, online ordering, and inventory management. The term "server" as used herein also refers to application servers, web servers, database servers, and so forth necessary to carry out the present disclosure as is known to one having ordinary skill in the art.

Further, as alluded to above, the storage medium 204 stores information and applications used by server 202 to provide the features described herein. This may include webpages to be served to client computers and data regarding e-commerce, including product and sales information. It should be understood that the storage medium 204 may be utilized to store any information and/or computer applications necessary to carry out the present invention. The networks referred to herein may include any data communications system that interconnects computer systems at various different sites. A network may be composed of any combination of LANs, WANs, or the Internet, for example.

As discussed above, sellers are constantly trying to aid buyers in "successful" e-marketing experiences. On an e-commerce website, a buyer or user can search an e-commerce website database to identify desired products. This product search is typically done by having the user enter a key term or terms that the user believes identify or describe the desired product into a search engine maintained by the seller.

For use in this application a "successful" user search determination occurs when, after a user-initiated products search has been performed, the user clicks on a product webpage and stays on the resulting product webpage for a predetermined amount of time (for example, 7 seconds or more). A successful user determination can also result from a refinement search, where a user is satisfied or somewhat satisfied with the initial product search, but further refines the search to further limit the resulting list of products. Ultimately, a successful determination should represent the user finding the product or products the user desires. Examples of unsuccessful determinations include abandoning a resulting product webpage very quickly, a product search that results in no listed products, a second search that is in a different product category from the initial product search (reflecting a bad initial search), clicking on a main or alternative menu link on the webpage, and a user abandoning the seller e-commerce website without selecting a product.

The present invention overcomes many of the contributing factors that lead to unsuccessful searches by creating a dynamic computer program that analyzes users' behavior on the seller's e-commerce website including identifying how users correct or modify unsuccessful product searches. The computer program then applies the resulting corrections to subsequent user product searches.

For example, the present invention corrects product search errors caused by industry specific terminology, misspellings, product term synonyms, compound nouns, plurals, and product brand name substitutions by taxonomy.

In an illustrative embodiment of the present invention, a computer program will identify a first term (term 1) entered by a user into an e-commerce product search engine. If the initial search is unsuccessful, the program will then identify the second term (term 2) entered by the user. The program keeps track of each occurrence (count 1) of term 1 and each time the user uses both term 1 and term 2 (co-occurrence or cntb). The program can then calculate a confidence score (conf score) that can reflect how often the term 2 resulted in a successful determination.

FIG. 3 is an exemplary table of search terms (term 1 and term 2) entered by users and the resulting confidence score (conf score) calculated by the present invention. The confidence score can be calculated in an exemplary embodiment, by dividing the cntb by the count 1. The computer program can be configured to identify occurrences where the confidence score is significant, for example if the confidence score is above 0.5. If the program determines that a confidence score is significant, then the program can be configured to modify the search results of subsequent user product searches to include the product results of term 2 whenever term 1 is entered by the user. This modification of search results will improve the success rate of user initiated searches without the user having to enter a second term (term 2).

In an illustrative embodiment of the present invention, the program can cluster common terms relevant to the users frequently using the e-commerce product search engine and facilitate more useful and successful product searches. These clusters of common terms can also be considered synonym lists and can be generated using Frequent Pattern-Growth models, which utilize the confidence scores of terms to determine when search term results should be modified to account for commonly used, and commonly successful, synonyms and/or terms clusters. The program can also be configured to be dynamic, having a rolling history that can update term synonyms and cluster lists and modify subsequent product search results on a rolling basis, for example daily, weekly, monthly, etc.

Figure 4:
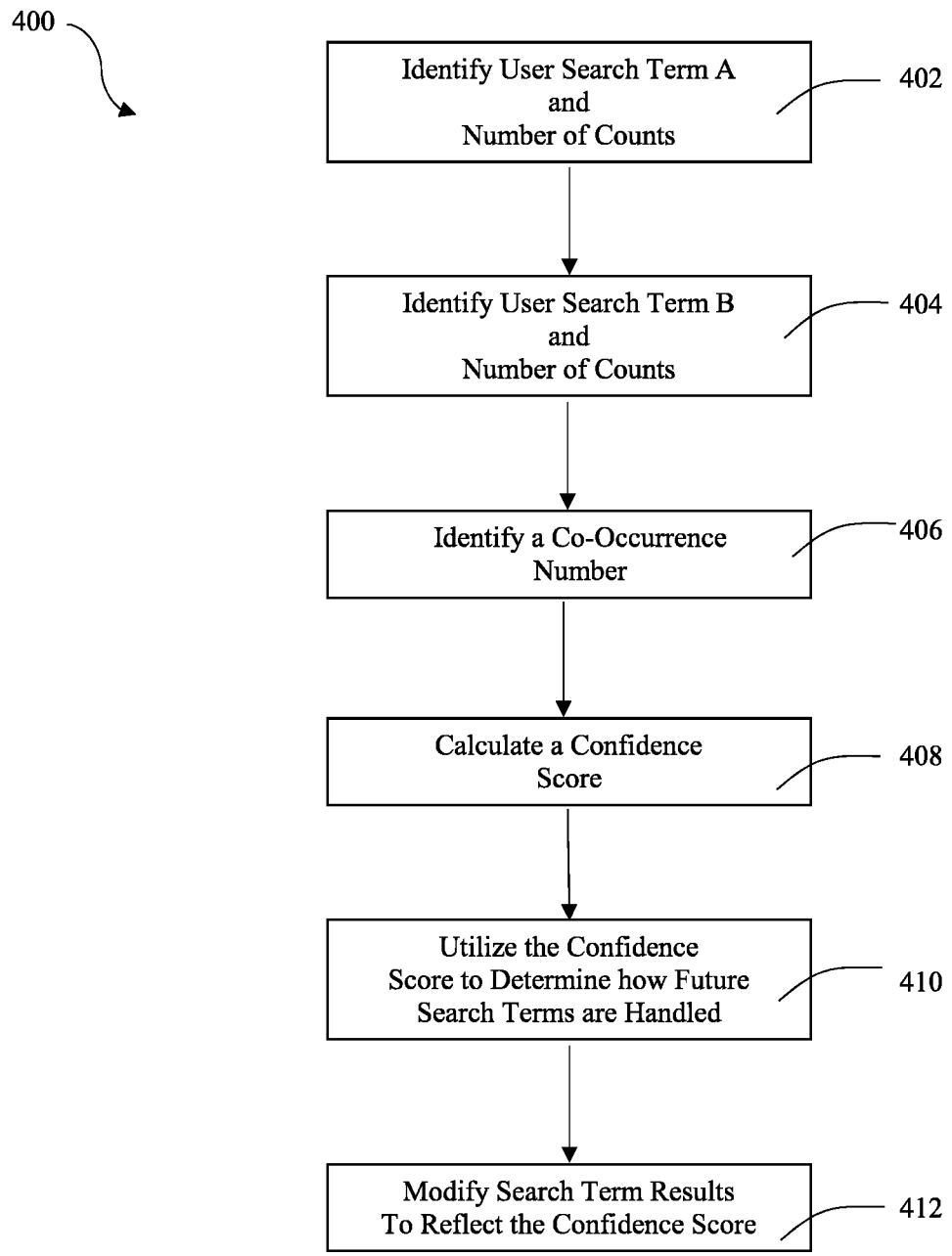
FIG. 4 is a method of creating a product search engine according to an embodiment of the present invention.

Another illustrative embodiment of the present invention is illustrated by the flow diagram in FIG. 4. A computer program of the present invention can be configured to execute each of the steps of the internal search method 400. First, the program will identify a user search term A and the number of occurrences the term is used 402 in a e-commerce product search engine. Second, the program will identify when a subsequent search term B is used by the user and the number of occurrences the term B is used 404. The program will then identify a co-occurrence number 406, which indicates when term A and term B were both used. A confidence score is then calculated 408 by the program on a rolling basis, enabling the confidence number to be continuously updated.

Once the confidence score has been calculated, the program will then determine if and how a subsequent product search should be modified to account for statistically significant confidence scores 410. For example a confidence score threshold can be determined or evaluated based on the counts of each term, the co-occurrence number, or a z-score. The z-score can be determined by the following formula, $z=(X-\mu)/\sigma$, where z is the z-score, X is the value of the element, $\mu$ is the population mean, and $\sigma$ is the standard deviation. In other exemplary embodiments, additional "scores" can be calculated to better reflect the likelihood of successful searches resulting from the utilization of term B with term A. Lastly, the program will modify future search term results to reflect the corresponding confidence scores 412. For example, the program may add term B search results to every term A search performed by a user. Alternatively, the program can substitute the search results of term B with the search results of term A (for example, if term A is a misspelling).

Figure 5:
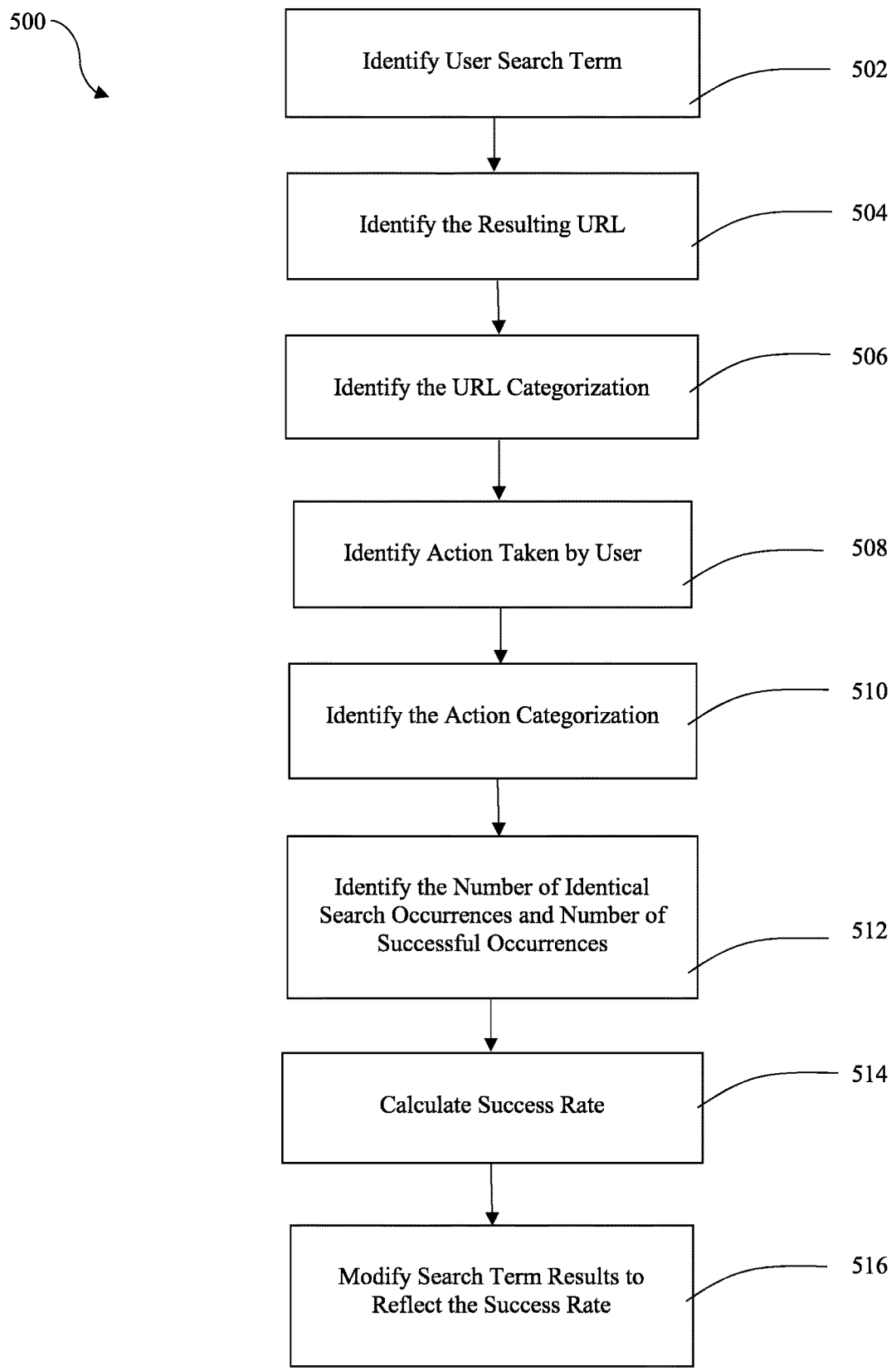
FIG. 5 is a method of creating a product search engine according to another embodiment of the present invention.

Another illustrative embodiment of the present invention is illustrated by the flow diagram in FIG. 5. A computer program of the present invention can be configured to execute each of the steps of the internal search method 500. First, the program will identify a user search term 502 and the resulting URL generated by the search term 504. Then the program will identify the categorization of the URL 506 and identify the action (click) taken by the user 508 and the categorization of the action 510. The program will then count the total search occurrences (using the identified search term 502) and the number that were successful 512. Using the number of successful searches, the program can then calculate the success rate of the search 514. This internal search method 500 can account for and "correct" searches that may be seasonally based or only relevant during the holidays. For example, the term "snow white" may be used to identify a storybook character more frequently during certain times of year and used to reference a color during other times of year. Based on the success rate and identification of user actions, the program can then modify the search term results to reflect the success rate in real time 516. This method of internal search modification can dynamically change and adjust product search results for trends that may occur intermittently in the marketplace.

FIG. 6 illustrates a table that can be utilized by another embodiment of the present invention. The table includes search terms (term A and term B) entered by users and the resulting success score (Success A and Success B) calculated by the present invention and a corresponding confidence score (Conf Score). The confidence score can be calculated in an exemplary embodiment as a factor of Success A and Success B. The computer program can be configured to identify occurrences where the confidence score is significant, for example if the confidence score is above 0.5, or some other selected value. If the program determines that a confidence score is significant, then the program can be configured to modify the search results of subsequent user product searches to include the product results of term B whenever term A is entered by the user, or vice versa. This modification of search results will improve the success rate of user initiated searches without the user having to enter a second term (Terms A and B).

The computer program can also be configured to redirect the search results of Term A to the search results of Term B or use Term A and Term B as synonyms. In further embodiments the program can configure the website to include the search results of Term B in a "related search" or "results also found in" sections of the Term A search result. Each of these embodiments can utilize the calculated confidence score on a rolling dynamic basis.

In each of the embodiments of the present invention, the confidence scores and success rate can be used to evaluate search terms such that poorly performing terms can be removed from "auto-complete" or "auto-redirect" features. Additionally, the disclosed embodiments can also modify filters and facets, such that the terms and search results having the highest confidence scores can by positioned at the top (or first) in subsequent product searches.

In an embodiment of the present invention, the program can cluster common terms relevant to the users frequently using the e-commerce product search engine and facilitate more useful and successful product searches. These clusters of common terms can also be considered synonym lists and can be generated using Frequent Pattern—Growth models, which utilize the confidence scores of terms to determine when search term results should be modified to account for commonly used, and commonly successful, synonyms and/or terms clusters. The program can also be configured to be dynamic, having a rolling history that can update term synonyms and cluster lists and modify subsequent product search results on a rolling basis, for example daily (even multiple times a day), weekly, monthly, etc.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly, and use may be made without departing from the principles and concepts set forth herein.

What is claimed is:

1. A method for creating an e-commerce, dynamic, internal search engine, said method comprising the steps of:
    providing a server having a memory, and a processor;
    providing the server with a search engine on an e-commerce website to identify and locate products and product inventory available for sale and configured to perform the steps of:
        identifying a first user search term input into the search engine that results in a first search result and a number of occurrences the first search term is input into the search engine;
        identifying a number of occurrences when the first search term yields a successful search result, wherein the successful search result of the first search term occurs when a user clicks on a product that was contained in the results of the first search result and either stays on the resulting product webpage for a predetermined amount of time or enters a refinement search on the results of the first search;
        identifying a second user search term input into the search engine subsequent to the first user search term that results in a second search result and a number of occurrences the second search term is input into the search engine;
        identifying a number of occurrences when the second search term yields a successful search result, wherein the successful search result of the second search term occurs when the user clicks on a product that was contained in the results of the second search result and either stays on the resulting product webpage for a predetermined amount of time or enters a refinement search on the results of the second search;
        modifying subsequent search results facilitated by the first user search term based on the successful search results of the second search term; and
        providing, to an end user's computing device, the search results of the second search term with the search results of the first search term when the number of successful search results of the second search term are significant as compared with the number of successful search result of the first search term when an input for a search for the first term is received by the server from the user's computing device via the e-commerce website,
    wherein the significance of the successful search results of the second term is significant as compared with the number of successful search results of the first search term when a confidence score is greater than a predetermined confidence score threshold,
    wherein the confidence score is calculated by dividing the number of successful search results yielded by the second search term by the occurrences of the first search term;
    wherein the confidence score threshold is determined to be a number where the search results of the second term are based on one of three methods including examining the counts of each term, determining the co-occurrence number, and determining a statistically significant z-score, wherein the z-score is determined by the formula $z=(X-\mu)/\sigma$ where z k the z-score, his the value of the element, $\mu$ is the population mean, and $\sigma$ is the standard deviation;
    wherein the search results of the first term and the search results of the second term are representative of products available for sale on the e-commerce website.

2. The method of claim 1, further comprising: the search engine performing the step of:
    calculating a confidence score that reflects the number of successful search results yielded by the second search term when compared to the number of occurrences of the first search term.

3. The method of claim 2, wherein the calculating of the confidence score includes dividing the number of successful search results yielded by the second search term by the occurrences of the first search term.

4. The method of claim 3, wherein the modifying of subsequent search results only occurs if the confidence score is above 0.5.

5. The method of claim 1, wherein the modifying of subsequent search results includes combining the search results of the first search term and the second search term.

6. The method of claim 1, wherein the modifying of subsequent search results includes replacing the search results of the first search term with the search results of the second search term.

7. The method of claim 1, wherein the modifying of subsequent search result is performed dynamically on a rolling basis.

8. The method of claim 1, wherein the modifying of subsequent search result is performed at predetermined time intervals.

9. The method of claim 1, wherein the successful search result is defined by a user engaging a product webpage for a predetermined amount of time.

10. The method of claim 9, wherein the successful search result is defined by a user engaging a product webpage for more than 7 seconds.

11. A system for dynamically adjusting an e-commerce, internal search engine, comprising:
    a server having a memory and a processor;
    the search engine on an e-commerce website to identify and locate products and product inventory available for sale, wherein the search engine is operable by the server and configured to:
        identify a first user search term input into the search engine that results in a first search result and a number of occurrences the first search term is input into the search engine;
        identify a number of occurrences when the first search term yields a successful search result, wherein the successful search result of the first search term occurs when a user clicks on a product that was contained in the results of the first search result and either stays on the resulting product webpage for a predetermined amount of time or enters a refinement search on the results of the first search;

identify a second user search term input into the search engine subsequent to the first user search term that results in a second search result and a number of occurrences the second search term is input into the search engine;

identify a number of occurrences when the second search term yields a successful search result, wherein the successful search result of the second search term occurs when the user clicks on a product that was contained in the results of the second search result and either stays on the resulting product webpage for a predetermined amount of time or enters a refinement search on the results of the second search;

modify subsequent search results facilitated by the first user search term based on the successful search results of the second search term; and provide, to an end user's computing device, the search results of the second search term with the search results of the first search term when the number of successful search results of the second search term are significant as compared with the number of successful search result of the first search term when an input for a search for the first term is received by the server from the user's computing device via the e-commerce website, wherein the search results of the second term are significant as compared with the number of successful search results of the first search term when a confidence score is greater than a predetermined confidence score threshold, wherein the confidence score is calculated by dividing the number of successful search results yielded by the second search term by the occurrences of the first search term;

wherein the confidence score threshold is determined to be a number where the search results of the second term are based on one of three methods including examining the counts of each term, determining the co-occurrence number, and determining a statistically significant z-score, wherein the z-score is determined by the formula $z=(X-\mu)/\sigma$ where z is the z-score, X is the value of the element, $\mu$ is the population mean, and $\sigma$ is the standard deviation;

wherein the search results of the first term and the search results of the second term are representative of products available for sale on the e-commerce website.

12. The system of claim 11, wherein the search engine is also configured to:

calculate a confidence score that reflects the number of successful search results yielded by the second search term when compared to the number of occurrences of the first search term.

13. The system of claim 12, wherein the calculating of the confidence score includes dividing the number of successful search results yielded by the second search term by the occurrences of the first search term.

14. The system of claim 13, wherein the modifying of subsequent search results only occurs if the confidence score is above 0.5.

15. The system of claim 11, wherein the modifying of subsequent search results includes combining the search results of the first search term and the second search term.

16. The system of claim 11, wherein the modifying of subsequent search results includes replacing the search results of the first search term with the search results of the second search term.

17. The system of claim 11, wherein the modifying of subsequent search result is performed dynamically on a rolling basis.

18. The system of claim 11, wherein the modifying of subsequent search result is performed at predetermined time intervals.

19. The system of claim 11, wherein the successful search result is defined by a user engaging a product webpage for a predetermined amount of time.

20. The system of claim 19, wherein the successful search result is defined by a user engaging a product webpage for more than 7 seconds.

* * * * *